Dec. 20, 1960   A. J. W. M. VAN OVERBEEK   2,965,848
DETECTOR CIRCUIT ARRANGEMENT
Filed Jan. 25, 1957

INVENTOR
ADRIANUS J. W. M. VAN OVERBEEK
BY
AGENT

United States Patent Office 2,965,848
Patented Dec. 20, 1960

2,965,848

DETECTOR CIRCUIT ARRANGEMENT

Adrianus Johannes Wilhelmus Marie van Overbeek, Eindhoven, Netherlands, assignor, by mesne assignments, to North American Philips Company, Inc., New York, N.Y., a corporation of Delaware Filed Jan. 25, 1957, Ser. No. 636,428

Claims priority, application Netherlands Jan. 28, 1956

8 Claims. (Cl. 329—103)

The invention relates to a circuit arrangement for detecting the phase difference between two electrical signals. Such arrangements may, for example, be used for measuring purposes, where one signal has constant frequency and phase and the phase of the other signal is to be measured, but in particular for demodulating frequency-modulated oscillations, where the two signals are derived from these oscillations via a discriminator network and exhibit a relative phase difference approximately proportional to the frequency sweep of these oscillations.

The invention has for its object to provide an arrangement, in which the detected current is substantially independent of unwanted amplitude modulations of the signals. It has the feature that the signals are supplied each to one of two amplifiers having a common output circuit, through which the detected current passes, whilst the common alternating output voltage of the amplifiers is limited to a value which is proportional to the mean signal amplitude. According to a further feature of the invention the amplifiers are fed across their common output impedance via a third amplifier, to the control-electrode of which is fed a voltage which is proportional to the mean signal amplitude and which limits the current amplitude across the third amplifier to a corresponding value.

The invention will be described with reference to the drawing.

Figure 1:
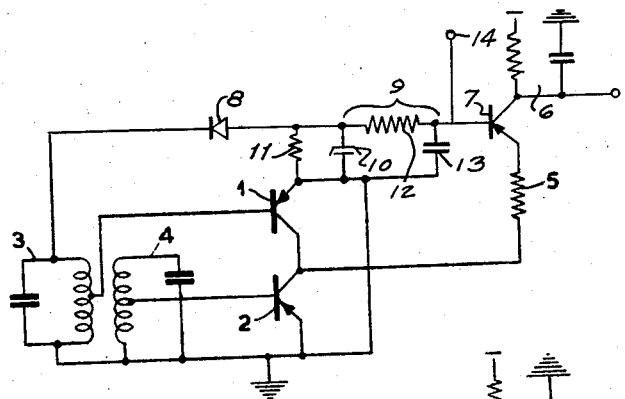
Fig. 1 shows one embodiment of the invention.

Fig. 1 shows two transistor amplifiers 1 and 2, to the base electrodes of which are supplied the two signals, the phase difference of which is to be detected. These signals may, for example, be derived in known manner with the aid of a discriminator network comprising two approximately critically coupled circuits 3 and 4 from frequency-modulated oscillations fed to the circuit 3.

The signals at the base electrodes of the transistors 1 and 2 render the transistors 1 and 2 respectively conductive during their negative half periods, so that collector current flows through a common collector impedance consisting of a resistor 5 and a detector output filter 6. This filter 6 may, if desired, be replaced for example by a current meter operating as a phase indicator.

The instantaneous value of the total current passing through the resistor 5 is limited in a manner to be described more fully, whilst the duration of the current varies with the relative phase difference between the voltages across the circuits 3 and 4. Thus the detector output filter 6 has produced across it a voltage which is approximately proportional to the phase difference to be measured, i.e. to the frequency sweep of the frequency-modulated oscillations.

In accordance with the invention the collectors of the transistors 1 and 2 are fed in common via a third transistor amplifier 7, to the base of which is fed a voltage which corresponds to the mean signal amplitude. This voltage is produced with the aid of a rectifier 8, having an output filter 9, so that the voltage across the circuit 3 is amplitude-detected and the low-frequency components in the detection product are suppressed.

The output filter 9 therefore consists preferably of a parallel RC-filter 10—11, having a resistor 11, which is decoupled by a capacitor 10 for the lowest modulation frequencies to be transmitted; with the rectifier 8 this filter constitutes a so-called limiter and produces by variable damping of the resonant circuit 3 a considerable suppression of the unwanted amplitude-modulation of the voltage across this circuit 3. The filter comprises, if necessary, a second resistor 12 and a capacitor 13 to suppress further the unwanted low-frequency oscillations, whilst the voltage across the filter may serve at the same time as an automatic gain control-voltage (terminal 14).

Since the base electrode of the transistor 7 is held on a substantially constant voltage corresponding to the mean signal amplitude, the current across the resistor 5 cannot exceed the value at which the corresponding voltage drop across the resistor 5 is approximately equal to the voltage at the base of the transistor 7. As soon as this value is reached, the emitter-collector voltage of the transistors 1 and 2 would be equal to zero and there could no longer flow a collector current. Consequently there occurs an instantaneous limitation of the total current across the resistor 5 on a value slightly lower than referred to above, so that this current and hence also the voltage across the filter 6 are substantially only dependent upon the relative phase difference and substantially independent of the amplitude of the voltage across the circuits 3 and 4.

Figure 2:
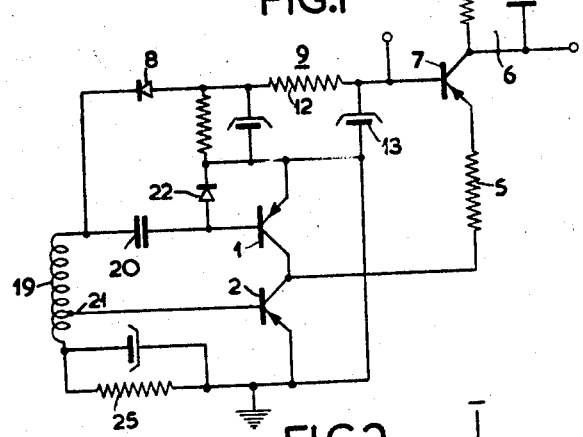
Fig. 2 shows a variation of the embodiment shown in Fig. 1.

Fig. 2 shows a variation of the arrangement shown in Fig. 1, used also for demodulating frequency modulated oscillations, in which arrangement only one input circuit is employed, which consists of an inductor 19 and a capacitor 20. The current across the capacitor 20 is fed to the base of the transistor 1 and the voltage at a tapping 21 of the inductor 19 is fed to the base of the transistor 2. The rectifier 22, the forward direction of which is opposite to that of the emitter-base circuit of the transistor 1, provides an approximately constant, small damping of the circuit 19—20 during the positive and negative half-period respectively of the circuit voltage.

This circuit voltage is detected again with the aid of the rectifier 8 and converted into a voltage corresponding to the mean signal amplitude and fed again to the base of the transistor 7, this voltage limiting accordingly the instantaneous value of the total current across the resistor 5, so that the voltage produced across the filter 6 is substantially independent of the unwanted amplitude modulation of the input signals.

It may be a disadvantage that with amplitude modulation of the voltage across the circuit 19—20 the currents passing through the transistors 1 and 2 respectively increase with a steepness of the edge varying with this amplitude modulation before the limit value is reached. In this case also the voltage across the filter 6 will vary slightly with this amplitude modulation. In order to reduce this effect, which may become troublesome only with an excessively high value of the base voltage of the transistor 7 with respect to the value of the resistor 5, the working point of at least one of the transistors may be shifted so that with an increasing amplitude the instant of opening of this transistor is slightly retarded and the instant of cut-off is slightly anticipated. In the arrangement shown in Fig. 2 this is obtained by including a very small resistor 25, which is preferably decoupled for the signal frequencies, in the base circuit of the transistor 2, across which the rectifier 8 produces, by base rectification in the transistor 2, the required low voltage corresponding to the unwanted amplitude modulation.

As an alternative this effect may be compensated to a great extent, by utilizing the abrupt variation in the base current of the transistor 7 of the arrangements shown in Figs. 1 and 2, when the transistors 1 and 2 become conductive, if the circuit elements i.e. a comparatively high resistor 12 and a comparatively low capacitor 13 are suitably chosen.

A further method of obviating this disadvantage may consist in that the voltage across the base of the transistor 7 is varied in a sense opposite this unwanted amplitude modulation. To this end the circuit amplitude may be detected with a polarity opposite that of the detector 8—9, after which the low-frequency component of this detection product is also fed to the base of the transistor 7.

Figure 3:
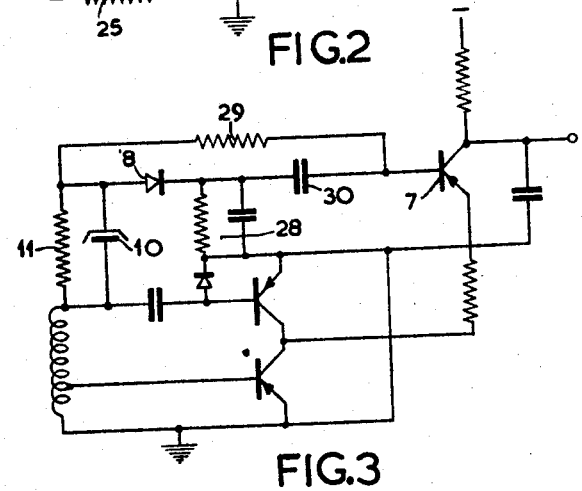
Fig. 3 shows a further variation of the embodiment shown in Fig. 1.

According to Fig. 3 the rectifier 8 is used to fulfill these two detector functions. Across the filter 10—11, having a high time constant, the direct voltage component of the detection product is produced with one polarity, across the filter 28, having a comparatively small time constant, and a very low resistance, is produced the direct-voltage and low-frequency alternating voltage component of the detection product with the other polarity. Via the separation resistor 29 and the separation capacitor 30 these two voltages are joined at the base of the transistor 7, the result of which is described above. These two methods have a disadvantage in that the operation of the rectifier 8 as a dynamic limiter is slightly less effective owing to a higher natural damping of the input circuit due to the series impedance 25 or 23 respectively.

Although it is immaterial whether the arrangements described above are equipped with tubes or with transistors, the use of junction transistors is to be preferred owing to their sharp limiting characteristic, which is of importance for the transistors 1 and 2, and owing to their low base-emitter voltage required for the transistor 7 to become conductive.

What is claimed is:

1. An electrical circuit for detecting the phase difference between two signals, comprising first and second amplifier devices each having an input electrode and an output electrode, means for applying said signals each to a respective input electrode, means for combining the output signals of said amplifier devices thereby to produce superimposed half periods of said signals having overall durations as determined by the phase difference between said two signals, said latter means comprising a common output circuit connected to both of said output electrodes, limiter means connected to said common output circuit for limiting the amplitude of said superimposed half periods of said signals to a value determined by the mean amplitude of said two signals, output means connected to said limiting means for producing an electrical quantity having a value as determined by the duration of said superimposed half periods of said signals, said limiter means comprising a third amplifier device having current carrying electrodes connected in series with said common output circuit and having a control electrode, and means connected to apply to said control electrode a control voltage which is proportional to the mean amplitude of said two signals.

2. A circuit as claimed in claim 1, including a dynamic limiter circuit connected to produce said control voltage.

3. A circuit as claimed in claim 1, in which each of said amplifier devices comprises a transistor having base, emitter and collector electrodes, said control electrode comprising the base electrode of said third amplifier device.

4. An electrical circuit for detecting the phase difference between two signals, comprising first and second amplifier devices each having an input electrode and an output electrode, means for applying said signals each to a respective input electrode, means for combining the output signals of said amplifier devices thereby to produce superimposed half periods of said signals having overall durations as determined by the phase difference between said two signals, said latter means comprising a common output circuit connected to both of said output electrodes, limiter means connected to said common output circuit for limiting the amplitude of said superimposed half periods of said signals to a value determined by the mean amplitude of said two signals, output means connected to said limiting means for producing an electrical quantity having a value as determined by the duration of said superimposed half periods of said signals, said limiter means comprising a third amplifier device having current carrying electrodes connected in series with said common output circuit and having a control electrode, means connected to apply to said control electrode a control voltage which is proportional to the mean amplitude of said two signals, each of said amplifier devices comprising a transistor having base, emitter and collector electrodes, said control electrode comprising the base of said third amplifier device, a load resistor connected at one end thereof to the emitter electrode of said third amplifier device and having the other end thereof connected jointly to the collector electrodes of the two remaining transistors.

5. A circuit as claimed in claim 4, including a dynamic limiter circuit connected to produce said control voltage, and a filter connected between said dynamic limiter circuit and said control electrode of the third amplifier device.

6. A circuit as claimed in claim 4, including means connected to shift the working point of at least one of said transistors in accordance with the amount of amplitude modulation of said signals.

7. An electrical circuit for detecting the phase difference between two signals, comprising first and second amplifier devices each having an input electrode and an output electrode, means for applying said signals each to a respective input electrode, means for combining the output signals of said amplifier devices thereby to produce superimposed half periods of said signals having overall durations as determined by the phase difference between said two signals, said latter means comprising a common output circuit connected to both of said output electrodes, limiter means connected to said common output circut for limiting the amplitude of said superimposed half periods of said signals to a value determined by the mean amplitude of said two signals, output means connected to said limiting means for producing an electrical quantity having a value as determined by the duration of said superimposed half periods of said signals, said limiter means comprising a third amplifier device having current carrying electrodes connected in series with said common output circuit and having a control electrode, means connected to apply to said control electrode a control voltage which is proportional to the mean amplitude of said two signals, each of said amplifier devices comprising a transistor having base, emitter and collector electrodes, said control electrode comprising the base electrode of said third amplifier device, a source of a frequency-modulated oscillation, a discriminator network connected to said source and comprising first and second tuned inductors mutually coupled together, means connecting an end of each of said inductors jointly to the emitter electrodes of said first and second amplifier devices, means connecting the base electrode of said first amplifier device to a point on said first inductor, and means connecting the base electrode of said second amplifier device to a point on said second inductor.

8. An electrical circuit for detecting the phase difference between two signals, comprising first and second amplifier devices each having an input electrode and an output electrode, means for applying said signals each to a respective input electrode, means for combining the output signals of said amplifier devices thereby to produce superimposed half periods of said signals having overall durations as determined by the phase difference between said two signals, said latter means comprising a common output circuit connected to both of said output electrodes, limiter means connected to said common output circuit for limiting the amplitude of said superimposed half periods of said signals to a value determined by the mean amplitude of said two signals, output means connected to said limiting means for producing an electrical quantity having a value as determined by the duration of said superimposed half periods of said signals, said limiter means comprising a third amplifier device having current carrying electrodes connected in series with said common output circuit and having a control electrode, means connected to apply to said control electrode a control voltage which is proportional to the mean amplitude of said two signals, each of said amplifier devices comprising a transistor having base, emitter and collector electrodes, said control electrode comprising the base electrode of said third amplifier device, a source of a frequency-modulated oscillation, a discriminator network connected to said source and comprising an inductor and a capacitor connected in series between the emitter and base electrodes of said first amplifier device, and means connecting the base electrode of said second amplifier device to a point on said inductor.

References Cited in the file of this patent

UNITED STATES PATENTS

| 2,251,382 | Sziklai | Aug. 5, 1941 |

FOREIGN PATENTS

| 202,895 | Australia | July 28, 1955 |
| 764,428 | Great Britain | Dec. 28, 1956 |